United States Patent Office 3,412,156
Patented Nov. 19, 1968

3,412,156
PROCESS FOR PRODUCING
ω,ω′-DIAMINOALKANES
Keizo Ueda, Kobe-shi, Hyogo-ken, Tsuneo Ohakwahara, Hirakata-shi, Osaka-fu, and Takahiro Kubo, Houfu-shi, Yamaguchi-ken, Japan, assignors to Kanegafuchi Boseki Kabushiki Kaisha, Tokyo, Japan, a corporation of Japan
No Drawing. Filed Sept. 10, 1964, Ser. No. 395,566
Claims priority, application Japan, Sept. 11, 1963, 38/48,719
16 Claims. (Cl. 260—583)

ABSTRACT OF THE DISCLOSURE

A process for producing ω,ω′-diaminoalkanes of the general formula $$NH_2-(CH_2)_{2n+1}-NH_2$$

wherein $n$ is an integer from 3 to 6, which process comprises converting a compound selected from the group consisting of compounds represented by the formulas

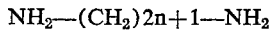

and

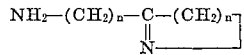

and mixtures thereof to said ω,ω′-diaminoalkanes by reducing the said compound by heating it with an aliphatic hydroxy compound having 1 to 6 carbon atoms and an alkali metal hydroxide to obtain diaminocarbinols of the general formula

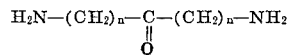

then dehydrating said diaminocarbinols in the presence of a dehydrating catalyst to obtain diaminoalkenes of the formula $$NH_2-(CH_2)_{m_1}-CH=CH-(CH_2)_{m_2}-NH_2$$

wherein $m_1+m_2$ is an integer 5, 7, 9 or 11 and then catalytically hydrogenating said diaminoalkenes.

A process for producing ω,ω′-diaminoalkanes of the general formula $$NH_2-(CH_2)_{2n+1}-NH_2$$

wherein $n$ is an integer from 3 to 6, which process comprises converting a compound selected from the group consisting of compounds represented by the formulas

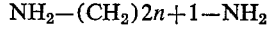

and

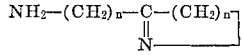

and mixtures thereof to the corresponding diaminoketone carbonates and directly reducing said carbonates to ω,ω′-diaminoalkanes.

---

This invention relates to processes for producing ω,ω′-diaminoalkanes or specifically diaminoalkanes having odd numbers of carbon atoms. More particularly the present invention relates to processes for producing diaminoalkanes represented by the general formula $$NH_2-(CH_2)_{2n+1}-NH_2$$

wherein $n$ is an integer of 3 to 6.
In the production of a straight chain diamine having an odd number of 7 to 13 carbon atoms, not only many steps are required but also the yield is poor and no excellent synthetic producing process is yet known. Therefore, natural substances have been mostly utilized. For example, 1,11-diaminoundecane, which is the most typical diamine produced by the process of the present invention, has been synthesized through several reaction steps such as of ozonization, esterification, reduction, halogenation, nitrile substitution and reduction from natural rice bran as a starting material.

However, in such process, there are defects that the yield is low and that the purity of the product is not high. Moreover, because also of the fact that the starting material is a natural substance which is unstable in price and quality, such conventional process is not adapted ot be industrially applied.

As a result of making a series of researchers to overcome such defects of the conventional process, we have discovered that an ω,ω′-diaminoalkane is synthetically obtained at a high yield and high purity by simple steps from a starting material which is a nitrogenous compound selected from a group consisting of (1) a lactam of 4 to 7 carbon atoms, (2) an ω-amino acid of 4 to 7 carbon atoms and (3) a polyamide whose component unit is an ω-amino acid of 4 to 7 carbon atoms.

It is therefore an object of the present invention to provide a new process for synthetically producing ω,ω′-diaminoalkanes.

Another object of the invention is to provide a process for producing the above mentioned compounds from easily available starting materials.

A further object of the present invention is to provide a process for cheaply producing ω,ω′-diamines which are raw materials on one side for nylon type polyamides.

Other objects of the invention will become clear from the following description.

The present invention is characterized by a combination of a step (A) of obtaining diaminoketone compounds (II and/or III) represented by the general equilibrium formula

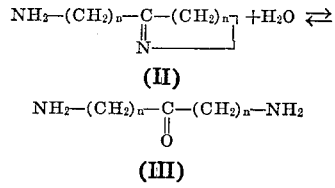

wherein $n$ is an integer of 3 to 6 from nitrogenous compounds belonging to the above mentioned group and a step (B) of obtaining ω,ω′-diaminoalkanes (VI) represented by the general formula $$NH_2-(CH_2)_{2n+1}-NH_2$$

(VI)

wherein $n$ is an integer of 3 to 6
from the thus obtained diaminoketone compounds.

First of all, the step A is described in detail in the following.

The nitrogenous compounds to be used as starting materials in the step A are concretely as follows (1) α-pyrrolidone, α-piperidone, ε-caprolactam and enanthlactam,
(2) ω-aminobutyric acid, ω-aminovaleric acid and F-aminoheptanoic acid and
(3) polybutylamide, polyvaleramide, polycapramide and polypeptamide.

Those belonging to the groups (1) and (2) are so-called monomers and those belonging to the group (3) are so-called polymers. The polymers in (3) may be of a polymerization degree of at least 2 and need not be of such high polymerization degree as has a fiber forming ability. The oligomers by-produced in producing polyamides can be also utilized.

The ε-caprolactam and polycapramide are the most important in view of the facts that they are industrially mass-produced today as so-called 6-nylon and its raw materials and that the properties of the polyamides produced from the diamines obtained from them according to the present invention and dicarboxylic acid are excellent. Therefore, in the present specification, they shall be properly represented by caprolactam and capramide.

The diaminoketone compound (II) obtained from such nitrogenous compound (I) has a cyclic structure containing a Schiff's bond and forms such equilibrium system as is represented by the formula

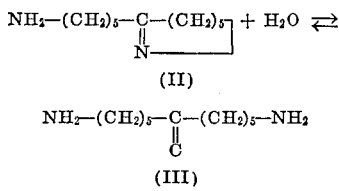

in the presence of water.

The diamino compound (III) or di (ω-aminoalkyl) ketone can not be isolated but, if it is made a carbonate or acyl derivative, it will be able to be separated. The carbonate derivative has a property that, if it is heated to be above about 100° C. under atmospheric pressure or, for example, if the di (ω-aminopentyl) ketone is heated to be above 120° C., it will be cyclized again to a diamino compound (II) having a Schiff's bond while discharging carbon dioxide.

Such diaminoketone compound (II) is produced by heating the nitrogenous compound (I) in the presence of a base. But, in the case of heating ω-lactam or ω-amino acid as a compound (I), this reaction will be a condensation or dimerization as mentioned below and, in the case heating polyamide, this reaction should be said to be a decomposition.

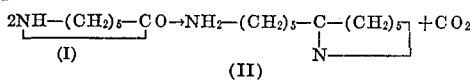

Useful as bases to be used in this reaction are such alkali metals as lithium, sodium and potassium, their oxides, hydroxides, carbonates, alcoholates and phenolates, such alkaline earth metals as calcium, strontium and barium, their oxides, hydroxides, carbonates, alcoholates and phenolates, primary to tertiary amines and quaternary ammonium hydroxide. Stable in the reaction conditions, high in the ability to accelerate the dimerization of lactams and easy to handle are the oxides and hydroxides of the alkali metals and alkaline earth metals.

When a nitrogenous compound (I) is heated at 100 to 500° C. or specifically at 150 to 450° C. in the presence of such base, a diaminoketone compound (II) will be produced. The heating need not be at a constant temperature all the time. For example, it may be at a comparatively low temperature in the first stage and at a comparatively high temperature in the later stage.

Though different depending on various factors, the reaction time is generally 0.1 to 10 hours or specifically 0.5 to 5 hours. The reaction pressure is usually atmospheric pressure but, if required, a superatmospheric pressure condition less than 10 kg./cm.$^2$ or a reduced pressure condition more than 10 mm. Hg may be applied.

The thus obtained diaminoketone compound (II) is generally liquid at room temperature and it is gradually distilled out with the progress of the reaction. The distillate is generally impure. The diaminoketone compound (II) contains such impurities as, for example, a lactam, but it can be easily refined.

One refining method is to blow in carbon dioxide. That is to say, if required, water and such organic medium as a lower alcohol, lower ether, lower ester, hydrocarbon or hydrocarbon halide are added and the mixture is saturated with carbon dioxide, the diaminoketone compound will be converted to a crystal substance which will precipitate. Therefore, if it is collected, is properly washed or recrystallized and is then heated to be decomposed, a purified diaminoketone compound (II) will be obtained.

Another refining method is to form a crystalline acylate (amide derivative) by treating the distillate with such lower fatty acid (of less than 3 carbon atoms) as formic acid, acetic anhydride or acetic acid, its anhydride or such acylating agent as a ketone or acetyl chloride. That is to say, as required, if it is treated with such acylating agent as acetic anhydride, acetic acid, formic acid or a ketene under the coexistence of such accelerator as sulphric acid, p-toluene sulphonic acid or pyridine, the diaminoketone compound (II) having a Schiff's bond will be easily converted to a diaminoketone compound (III) or an acyl derivative of a di (ω-aminoalkyl) ketone. It is generally crystalline and can be therefore easily separated and refined.

In case acetic anhydride is used as an acylating agent, the acylation will proceed very easily even at room temperature. For example, the acylate of di (ω-aminopentyl) ketone is crystals of a melting point of 140 to 141° C. and can be easily recrystallized from water. The thus obtained carbonate or acylate need not be converted to the original diaminoketone compound (II) but can be used as is in the next step B.

The step B is described in detail as follows.

This step is to obtain ω,ω'-diaminoalkanes from the diaminoketone compounds (II and/or III). There are several methods therefore. They can be largely classified into indirect methods and direct methods. However, as they are after all intended to convert the >C=O (or >C=N—) radical to the >CH$_2$ radical, they are all reducing methods.

First of all, the indirect method comprises a combination of a step (a) obtaining di (ω-aminoalkyl) carbinols (IV) represented by the general formula.

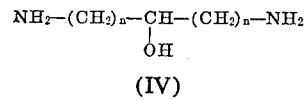

wherein n is an integer of 3 to 6 by hydrogenating the diaminoketone compounds, a step (b) of obtaining ω,ω'-diaminoalkenes (V) represented by the general formula.

$$NH_2-(CH_2)_{m1}-CH=CH-(CH_2)_{m2}-NH_2$$

(V)

wherein $m_1+m_2$ is an integer of 5, 7, 9 or 11 by dehydrating the thus obtained carbinols and a step (c) of obtaining ω,ω'-diaminoalkanes by hydrogenating the thus obtained diaminoalkenes.

The step (a) can be made to proceed advantageously by heating a

The step (a) can be made to proceed advantageously by heating a diaminoketone compound selected from a group consisting of diamines having a Schiff's bond represented by the above mentioned general formula (II) and diaminoketones represented by the above mentioned general formula (III) and in equilibrium with the above mentioned diamines having Schiff's bonds and their carbonates and acylates (the acyl radical having 1 to 3 carbon atoms) in the presence of a lower aliphatic hydroxy compound and an alkali metal hydroxide and, as required, under the coexistence of water.

There has been known no excellent process for producing di (ω-aminoalkyl) carbinols. In fact, as a result of making detailed researches on the reactivity of amines having the above mentioned Schiff's bonds, we have come to know that, even if the above mentioned amine having a Schiff's bond or an inorganic or organic acid obtained from it is catalytically reduced in the presence of such metallic catalyst as Raney nickel or Raney cobalt, the object di (ω-aminoalkyl) carbinol will be very difficult to obtain and that, in such case, a 2-(ω-aminoalkyl) azacyclohexane represented by the general formula

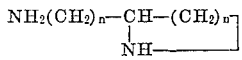

will be mostly produced. However, when it is chemically reduced with a lower aliphatic hydroxy compound and an alkali metal hydroxide as described above, a di (ω-aminoalkyl) carbinol of a high purity will be obtained at a very high rate of yield and very satisfactory results will be obtained in both of the separation of the product and the ease of the step.

The basic raw material in the step (a) is an amine having a Schiff's bond represented by the above mentioned general formula II. It can be made an aqueous solution and used as an equilibrium mixture of II and III. However, in order to elevate the thermal and chemical stability during the reaction, it may be used as a carbonate by saturating its aqueous solution with carbon dioxide or as a derivative by acylating it to protect the terminal amino radical.

The lower aliphatic hydroxy compound to be used in working the step (a) is a monohydric or polyhydric alkanol of 1 to 6 carbon atoms. There can be concretely enumerated therefor methanol, ethanol, isopropanol, n-propanol, butanol, glycerol and ethylene glycol. When ethanol is used, the reaction velocity will be high and excellent results will be obtained.

The proper reaction temperature is 100 to 300° C. or specifically 150 to 200° C. When the heating time is 0.5 to 6 hours or specifically 1 to 4 hours, favourable results will be obtained. The reaction pressure is usually atmospheric pressure.

During the heating, the above mentioned lower aliphatic hydroxy compound will react with the alkali metal hydroxide to produce active hydrogen and water. By these water and nascent hydrogen, the amine (II) having a Schiff's bond will be very easily subjected to ring-opening and reduction and will be converted to the object di (ω-aminoalkyl) carbinol. In case it is subjected to reduction as an acylate, the carbinol will be obtained usually as an acylate.

In reducing an acylate of the diamine (III) or an amide derivative of the di (ω-aminoalkyl) ketone, catalytic reduction is also effective. That is to say, when such catalyst as Raney cobalt or Raney nickel is added, the reaction will easily proceed at 10 to 250° C. or specifically 20 to 200° C. under a hydrogen pressure of less than 20 atmospheres or usually less than 10 atmospheres without any solvent or in the presence of water or such organic solvent as an aliphatic hydroxy compound, ether, hydrocarbon or hydrocarbon halide. In case the diamine is acylated, as different from the case that it is catalytically reduced as a salt, the acyl derivatives of the di (ω-aminoalkyl) carbinol will be obtained substantially without any secondary reaction. The di (ω-diaminoalkyl) carbinol is a new substance. When it is of such odd number as 7 to 13 of carbon atoms, it will exist generally as white crystals at the normal temperature.

The step (b) is to produce a diaminoalkene by dehyrating a diaminocarbinol or its derivative and comprises dehydrating the diaminocarbinol represented by the above mentioned general formula (IV) or its acylate in a liquid phase or vapour phase in the presence of a dehydrating catalyst.

For the dehydrating catalyst there are aluminum oxide, thorium oxide, magnesium oxide, zinc oxide, tungsten blue oxide, quartz sand, aluminum, siliceous clay, graphite, aluminum phosphate, zinc chloride, sulphuric acid, hydrogen halide, phosphoric acid, formic acid, acid sodium sulphate, p-toluene sulphonic acid and basic aluminum phosphate.

Such di (ω-aminoalkyl) carbinol as di (ω-aminopropyl) carbinol, di (ω-aminobutyl) carbinol, di (ω-aminopentyl) carbinol or di (ω-aminohexyl) carbinol is heated at a proper temperature or specifically at 150 to 450° C. in contact with such catalyst. The heating temperature of 250 to 350° C. is especially excellent to obtain an ω,ω'-diaminoalkene at a very high yield.

In such case, it is effective to use such inert gas as nitrogen gas or such organic solvent as cyclohexane or toluene as a diluent as required.

It is also a very effective method to catalytically heat a vapour of the di (ω-aminoalkyl) carbinol by passing it through a tower charged with the above mentioned catalyst supported on such inert substance as diatomaceous earth, coke or charcoal. Or else, the di (ω-aminoalkyl) carbinol is heated at a temperature of 50 to 150 or specifically around 80 to 120° in a liquid phase together with an aqueous solution of such above mentioned mineral acid as sulphuric acid, hydrogen halide or phosphoric acid. In the case of such liquid phase dehydration, for the dehydration, for the especially suitable concentration of the dehydrating agent it is preferable to use an aqueous solution of phosphoric acid containing 50 to 70% by weight $H_3PO_4$ or of sulphuric acid containing 20 to 50% by weight $H_2SO_4$. However, as required, it is possible to carry out the reaction in a non-aqueous system by using such organic solvent as hydrocarbons or chlorinated hydrocarbons, for example, benzene, toluene, chlorobenzene, hexane or cyclohexane.

In case a mineral acid is used as a dehydrating agent, the produced diaminoalkene will be a mineral acid salt. Therefore, an aqueous solution of such proper base as, specifically, ammonia, an alkali metal hydroxide or carbonate or an alkaline earth metal hydroxide or carbonate is added to neutralize and separate the layer. It is also a proper method to remove the mineral acid by using an ion-exchange resin without neutralizing it with a base. An acylate or carbonate of the diaminocarbinol may be used as a raw material to be dehydrated. For example, in dehydration with a metal oxide, an N,N'-diacyl derivative of the di (ω-aminoalkyl) carbinol may be passed through a heated tower charged with aluminum oxide. The proper heating temperature is 200 to 400° C. or specifically 250 to 360° C. Thus, an N,N'-diacyl derivative of the ω,ω'-diaminoalkene is obtained at a high rate of yield without the decomposition of the terminal acyl radical. In the case of dehydration with an aqueous solution of a mineral acid, the hydrolysis of the acyl radical will proceed simultaneously. After the completion of the reaction, the product obtained by separating the layer with an alkali will be an ω,ω'-diaminoalkene.

In the ω,ω'-diaminoalkene, there are an isomer based on the movement of a double bond and cis- and trans-geometrical isomers based on double bonds. When the cis-body is heated to a temperature around 200° C., it will be converted to a more stable trans-body. Therefore, as detailed also in the examples, in case the diaminocarbinol is heated and dehydrated with such metal oxide catalyst as aluminum oxide, a trans-ω,ω'-diaminoalkene will be mostly produced. On the other hand, the diaminoalkene obtained by heating and dehydrating it with an aqueous solution of such mineral acid as is mentioned above is a mixture of a cis-body and a trans-body. When this mixture is heated to a temperature around 200° C., it will be able to be isomerized to a trans-diaminoalkene.

In order to isomerize the diaminoalkene by moving its double bond, it is heated in a liquid phase with a concentrated aqueous solution of such mineral acid as sulphuric acid or hydrogen halide acid and the mineral acid is neutralized with an aqueous solution of such alkali as caustic soda, caustic potash, sodium carbonate, calcium hydroxide or calcium carbonate and is heated again. For the concentration of the catalyst for making such isomerization proceed, an aqueous solution of sulphuric acid containing 50 to 90% by weight or specifically 60 to 80% by weight $H_2SO_4$ or an aqueous solution containing 20 to 50% or specifically 30 to 40% hydrogen halide is effective. The dehydration of the diaminocarbinol and the isomerization of double bond can be carried out simultaneously also by varying the concentration of such mineral acid.

The $\omega,\omega'$-diaminoalkene is a new substance. When it is of such odd number as 7 to 13 carbon atoms, it will exist generally as an oily substance at room temperature.

The step (C) is to hydrogenate an $\omega,\omega'$-diaminoalkene. The hydrogenation may be carried out catalytically.

A catalyst consisting of copper, nickel, cobalt, platinum or palladium is effective to the catalytic hydrogenation. It may be used as supported with such proper carrier as charcoal, alumina, asphalt or pumice or as finely dispersed, for example, with platinum black. Raney nickel and Raney cobalt obtained by being developed with an aqueous solution of an alkali hydroxide are especially effective.

The production of the $\omega,\omega'$-diaminoalkane by hydrogenation proceeds easily at a low temperature and pressure in a liquid phase. For example, in the case of using a perforated nickel catalyst, it is convenient to maintain the operating pressure at 1 atmosphere by gauge and the temperature around 80° C. In the case of using a platinum catalyst, the reduction can be easily carried out at a high yield by the same operation at room temperature.

Further, the reduction in a gas phase, for example, by passing in a vapour phase the $\omega,\omega'$-diaminoalkene together with hydrogen on nickel supported on diatomaceous earth kept at a high temperature of 100 to 400° C. is also an effective method.

As detailed also in the examples, these reducing methods are of substantially the same conditions as of the known conventional catalytic hydrogenation.

In such hydrogenating method, a diaminoalkane can be obtained at a very high yield, the process is simple and such secondary reaction product is very little.

The hydrogenation of the $\omega,\omega'$-diaminoalkene may be carried out in the form of an acyl derivative. That is to say, by using such catalyst as Raney nickel, Raney cobalt, platinum or palladium in the same manner as in the case of no acylation, an N, N'-acyl derivative of the $\omega,\omega'$-diaminoalkane can be obtained. In such case, by-produced secondary amine as is usually simultaneously caused in the hydrogenating step will not be seen at all.

In order to obtain a diaminoalkane from the thus obtained acyl derivative of the $\omega,\omega'$-diaminoalkane, it may be heated together with an aqueous solution of such mineral acid as sulphuric acid or hydrochloric acid or of such alkali as ammonia or caustic soda. If it is heated specifically under reflux with an aqueous solution of a mineral acid, the hydrogenating reaction will be completed within a short time.

The thus obtained $\omega,\omega'$-diaminoalkane is alkaline, is in crystals which can be easily separated from the aqueous solution and refined.

In the case of thus producing the $\omega,\omega'$-diaminoalkane by the dehydration and hydrogenation of the $\omega,\omega'$-diaminoalkyl carbinol, in order to improve the selectivity in each step such as by preventing the production of the secondary amine in the hydrogenation of the diaminoalkene, it is desirable that such diamino compound is acylated. Therefore, the restoration of the acylate to a free diamine may be carried out after the step (C) or when the acylated substance has become the $\omega,\omega'$-diaminoalkane. But, as desired, it may be carried out after the step (a) or (b). Further, as required, only the desired step among the steps (a) to (c) may be carried out after the conversion to the acyl derivative. For example, only in the hydrogenating step (c), the diamine (or diaminoalkene) is acylated to prevent the production of the secondary amine.

In order to obtain $\omega,\omega'$-diaminoalkanes from the diaminoketone compounds (II and/or III) according to the present invention, not only the indirect method comprising the combination of the above described steps (a) to (c) but also a direct method of obtaining the $\omega,\omega'$-diaminoalkanes at once from the diaminoketone compounds (II and/or III) can be resorted to. That is to say, as a result of making detailed researches on the reactivity of di ($\omega$-aminoalkyl) ketones, we have discovered that, if the di ($\omega$-aminoalkyl) ketones (II and/or III) or their carbonates are reduced by Wolff-Kischner's reducing method or a catalytic hydrogenating method, the $\omega,\omega'$-diaminoalkanes will be obtained at a high yield and a high purity and the process will be very simple.

The carbonate of the di ($\omega$-aminoalkyl) ketone to be used in this process is in white crystals which are obtained easily by quantitatively ring-opening the diamino compound (III) having a Schiff's bond by adding carbon dioxide in the presence of more than equal mols of water and which are hardly soluble in such organic solvents as alcohols, benzene, acetone, etc.

The direct method according to the present invention is to produce $\omega,\omega'$-diaminoalkanes on the basis of the behaviour of di ($\omega$-aminoalkyl) ketones. In such case, for the salt of the ketone, only the carbonate will be effective but any of such other salts as, for example, the hydrochloride, sulphate, nitrate, monocarboxylate and dicarboxylate will cause a secondary reaction or produce a resinous substance during the reduction and will be improper to use in the process of the present invention.

The carbonate of the di ($\omega$-aminoalkyl) ketone need not be used as isolated as crystals. It is advantageous to use a reaction solution obtained as described above by adding carbon dioxide to it. Wolff-Kischner's reducing method is a reducing method having such contents as are mentioned, for example, in Organic Reaction IV (published by John Wiley & Sons, Inc., New York in 1954). In working this method in the present invention, the di ($\omega$-aminoalkyl) ketone (II or III) or its carbonate is mixed with water or such proper organic solvent as, for example, a lower alcohol, lower ether or hydrocarbon, has at least equal mols of hydrazine or hydrazine hydrate or its aqueous solution added thereto and is heated in the presence of such base as caustic soda, caustic potash, potassium carbonate, metallic sodium, sodium alcoholate, calcium hydroxide or calcium carbonate. The heating temperature is 90 to 270° C. or specifically 100 to 180° C. The proper heating time is 1 to 3 hours. When a solvent is used, it will be distilled out with the rise of the temperature and should be properly recovered. It is usual to carry out the reduction under the normal pressure. However, it is effective to carry it out under a somewhat reduced or added pressure as required. As described also in the examples, any other suitable reducing conditions are substantially the same as of the known conventional Wolff-Kischner's reducing method.

Any other chemical reducing method than Wolff-Kischner's method is unsuitable. For example, it is well known that Clemmensen's reducing method is effective as a method of reducing ketone radicals to methylene radicals. However, as a result of detailed experiments, we have discovered that di ($\omega$-aminoalkyl) ketone carbonates cannot be reduced at all by Clemmensen's method. Further, even if a di ($\omega$-aminoalkyl) ketone is used, it will be impossible to obtain an $\omega,\omega'$-diaminoalkane by Clemmensen's reducing method.

In catalytically reducing the carbonate of a di ($\omega$-aminoalkyl) ketone, it may be mixed with water or such proper organic solvent as is mentioned above, may have such catalyst as copper aluminum oxide, copper chromium oxide or nickel added thereto and may be heated while being stirred in the presence of hydrogen under a pressure in an autoclave. As described in the examples, these catalytic reducing conditions and catalysts are substantially the same as those already known. The proper reaction temperature is 160 to 280° C. At a temperature lower than that, a di (ω-aminoalkyl) carbinol will be mostly produced.

The carboxyl radical of the carbonate of the di (ω-diaminoalkyl) ketone not only makes the reduction of said ketone easy but also easily discharges carbon dioxide by being heated after or simultaneously with the reduction of the ketone radical and gives the object ω,ω'-diaminoalkane without any secondary reaction while covering the interior of the reaction system with the inert gas.

The ω,ω'-diaminoalkanes obtained by the process of the present invention has a feature of giving a polymer of a high polymerization degree as a polyamide with dicarboxylic acid and is useful as a raw material for synthetic fibers.

Examples of the present invention are given in the following.

EXAMPLE 1

When a mixture of 900 parts of ε-caprolactam and 700 parts of a powder of calcium hydroxide was heated at 200° C. under stirring for 30 minutes and was then heated at an internal temperature of 350° C. for 2 hours 710 parts of a distillate were obtained.

When 130 parts of water and 3,500 parts of isopropyl alcohol were added to 710 parts of the distillate and the mixture was saturated with carbon dioxide, crystals were deposited. When the crystals were separated by suction and were then heated to 180° C., they liquefied. When the liquid was distilled under a reduced pressure, 460 parts of a liquid having a boiling point of 142 to 146° C. under a reduced pressure of 9 mm. Hg. were obtained.

The infrared ray absorption spectrum of this liquid showed an absorption of sharp —C=N— bond at 6.0μ and an absorption of an amino radical at 2.95 and 3.05μ.

The elemental analysis values of this product showed 72.5% C, 12.1% H and 15.5% N and coincided with those of the structural formula

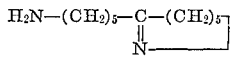

When 18 parts of water were then added to 182 parts of this liquid, the liquid generated heat and reacted. In the infrared ray absorption spectra of the product, the absorption strength of —C=N— at 6.0μ decreased and a new absorption band appeared at 5.8μ. This shows the production of a ketone radical.

EXAMPLE 2

900 parts of polycapramide were melted by being heated to 250° C. 600 parts of a powder of calcium oxide were then added to the melt and the mixture was stirred. When the mixture was then heated at an internal temperature of 360° C. for 3 hours, 692 parts of a distillate were obtained. When 258 parts of acetic anhydride were added to the distillate while it was being cooled to 20° C., crystals were deposited. When these crystals were separated under suction and were recrystallized from water, a melting point of 141° C. was shown.

The element analysis values of this product were 63.5% C, 9.86% H and 9.8% N. Its infrared ray absorption spectra showed an absorption of a ketone radical at 5.8μ and an absorption of an amide radical at 6.01 and 6.37μ. Such values coincided with those of the structural formula

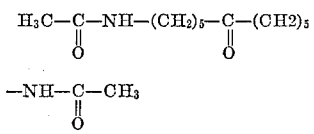

EXAMPLE 3

When 250 parts of caustic soda were added to 260 parts of ω-aminocaproic acid and the mixture was then heated at an internal temperature of 380° C. for 2 hours under stirring, 210 parts of a distillate were obtained. When 40 parts of water and 1000 parts of benzene were added to the distillate and the mixture was saturated with carbon dioxide, crystals were deposited. These crystals were separated under suction and were then liquefied by being heated to 160° C. When this liquid was distilled under a reduced pressure, 42 parts of a liquid having a boiling point of 142 to 146° C. under a reduced pressure of 9 mm. Hg. were obtained.

The infrared ray absorption spectra of this product were exactly the same as in Example 1.

EXAMPLE 4

A mixture of 100 parts of an amine having a Schiff's bond represented by the structural formula

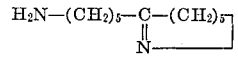

99 parts of distilled water and 51 parts of ethyl alcohol was dropped over 1 hour while being stirred into 150 parts of caustic potash melted by being heated to an internal temperature of 170° C. The evaporated excess ethyl alcohol was continuously distilled out of the system. After the completion of the dropping, the mixture was heated and stirred at an internal temperature of 180° C. for 3 hours. The mixture was cooled, 50 parts of distilled water were added to it and the oil layer was separated. When the oil layer was distilled under a reduced pressure, 107 parts of a colourless liquid having a boiling point of 178 to 180° C. under a reduced pressure of 5 mm. Hg were obtained. This product solidified into white crystals at the normal temperature, was well soluble in alcohols, acetone, diaxane, benzene, toluene, chloroform and water and was hardly soluble in ether, petroleum ether and ligroin. For its element analysis of $C_{11}H_{26}N_2O$, the calculated values were 65.4% C, 12.8% H and 13.8% N and the measured values were 64.9% C, 12.5% H and 14.0% N and coincided with those of di (ω-aminopentyl) carbinol.

EXAMPLE 5

When 22 mols of distilled water and 20 liters of isopropyl alcohol were added to 1 mol of an amine having the same Schiff's bond as in Example 4, Dry Ice was then thrown into the mixture and the mixture was stirred, white crystals were deposited. 150 g. of this di (ω-aminopentyl) ketone carbonate were heated and dissolved in 0.7 liter of ethyl alcohol and then 0.5 liter of the alcohol was distilled and recovered. The residue was dropped while being stirred onto 120 g. of caustic potash melted by being heated to 170° C. After the completion of the dropping, the mixture was heated at an internal temperature of 180° C. for 2 hours while the ethanol was being distilled and removed. The mixture was then cooled. 0.1 liter of distilled water and 0.4 liter of benzene were then added to it. The mixture was stirred and was then left standing and the benzene layer was taken. When the benzene was distilled and removed and the residue was distilled under a reduced pressure, 112 g. of white crystals having a boiling point of 180° C. under a reduced pressure of 5 mm. Hg were obtained.

The infrared ray absorption spectra of this product were exactly the same as of the product in Example 4.

EXAMPLE 6

600 ml. of ethanol were added to 150 g. of an amine having the same Schiff's bond as in Example 4 and the mixture was dropped over 40 minutes onto caustic potash melted by being heated to 170° C. Meanwhile the excess ethyl alcohol was continuously distilled out of the system.

After the completion of the dropping, the mixture was stirred at an internal temperature of 180° C. for 2 hours. 100 ml. of filtered water were added to the mixture and the oil layer was separated. When the oil layer was distilled under a reduced pressure, 162 g. of white crystals having a boiling point of 186° C. under a reduced pressure of 6.5 mm. Hg were obtained. This product showed a melting point of 49° C. and showed no melting point drop even when it was melted as mixed with the product in Example 4.

EXAMPLE 7

A solution prepared by adding 250 ml. of ethanol to 1 mol of an amine having the same Schiff's bond as in Example 4 was dropped over 40 minutes while being stirred into a solution prepared by adding 20 ml. of distilled water to 200 g. of caustic soda and melting the caustic soda by heating it to 160° C.

The mixture was refluxed for about 1 hour and the ethanol was then distilled out of the system and was recovered. The mixture was stirred at an internal temperature of 160° C. for 2 hours and the upper oil layer was separated. When the oil layer was distilled under a reduced pressure, 195 parts of white crystals of di (ω-aminopentyl) carbinol having a boiling point of 186° C. under a reduced pressure of 6.5 mm. Hg were obtained.

EXAMPLE 8

A mixture of 40 g. of filtered water and 150 ml. of isopropyl alcohol with 182 g. of an amine having the Schiff's bond mentioned in the specification was dropped over 40 minutes while the internal temperature was kept at 160° C. into the reaction vessel residue containing the caustic soda used in Example 7. The excess isopropyl alcohol was continuously distilled out of the system and was recovered. The mixture was further stirred an an internal temperature of 180° C. for 4 hours and the product was then extracted with benzene. When the benzene layer was taken, had the benzene distilled and removed and was then distilled under a reduced pressure, 150 g. of white crystals having a boiling point of 186° C. under a reduced pressure of 6.5 mm. Hg were obtained. At the same time, 20 g. of the unreacting amine having the Schiff's bond and distilled at 136° C. under a reduced pressure of 6.5 mm. Hg were recovered.

EXAMPLE 9

A mixture prepared by adding 2.2 mols of distilled water and 70 ml. of ethyl alcohol to 1 mol of an amine having a Schiff's bond represented by the structural formula

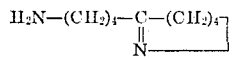

was dropped over 1 hour while being stirred into 200 parts of caustic potash melted by being heated to an internal temperature of 190° C. Meanwhile the evaporated excess ethyl alcohol was continuously distilled out of the system.

After the completion of the dropping, the mixture was stirred for 3 hours while the internal temperature was kept at 180° C. When the mixture was cooled and then distilled, 190 g. of a colourless liquid having a boiling point of 170° C. under reduced pressure of 4 mm. Hg were obtained. This liquid solidified into white crystals at the normal temperature. For its element analysis of $C_9H_{22}N_2O$, the calculated values were 62.07% C, 12.64% H and 16.09% N and the measured values were 62.1% C, 12.6% H and 16.14% N.

EXAMPLE 10

400 parts of filtered water and a Raney nickel catalyst were added to 300 parts of N,N'-diacetyl-di (ω-aminopentyl) ketone and the mixture was stirred at 70° C. for 2 hours in an autoclave kept at a hydrogen pressure of 7 atmospheres.

The pressure was then released and the catalyst was removed. When the mixture was cooled, 288 parts of white crystals of a melting point of 136 to 136.5° C. were obtained. This product was hardly soluble in ether and benzene but was soluble while hot in acetone, water and chloroform. The colour reaction of the ketone radical by the sodium nitroprusside method was negative.

The element analysis values of this product were 62.5% C, 10.4% H and 9.83% N and coincided with the theoretical calculated values of N,N'-diacetyl-di (ω-aminopentyl) carbinol.

EXAMPLE 11

200 parts of the N,N'-diacetyl-di (ω-aminopentyl) carbinol obtained in Example 10 were melted and were fed at a rate of 1 ml. per minute into an aluminum oxide charged tower 2.5 mm. in inside diameter, 100 cm. long and heated to 330° C. Thus crude N,N'-diacetyl-1,11-diaminoundecene-(5) was obtained at a rate of yield of 91%.

When it was recrystallized from acetone, it became white crystals of a melting point of 56 to 59° C. The infrared ray absorption spectra of this product showed characteristic absorptions of a trans-double bond at $10.38\mu$ and a cis-double bond at $14.18\mu$.

EXAMPLE 12

100 parts of water and 7 parts of a Raney cobalt catalyst were added to 100 parts of the N,N'-diacetyl-1,11-diaminoundecene-(5) obtained in example 11. The mixture was stirred at 80° C. for 2 hours under a hydrogen pressure of 6 atmospheres in an autoclave. The pressure was then released and the catalyst was removed. 60 parts of a solution of 60% sulphuric acid were added to the filtrate. The mixture was heated at 90° C. for 3 hours. After it was cooled, when ammonia water was added to it to make its pH 10, an oil layer separated. When the oil layer was distilled under a reduced pressure, 79 parts of a liquid having a boiling point of 152 to 154° C. under a reduced pressure of 15 mm. Hg were obtained.

The infrared ray absorption spectra of this product coincided with those of 1,11-diaminoundecane.

EXAMPLE 13

A mixture of 182 parts of an amine having the Schiff's bond mentioned in the specification, 100 parts of formic acid and 1 part of concentrated sulphuric acid was heated and reduced for 3 hours, was then cooled to 10° C. and was neutralized with an aqueous solution of caustic soda. Then the mixture was transferred together with a Raney nickel catalyst into an autoclave and was stirred at 90° C. for 3 hours under a hydrogen pressure of 70 atmospheres. It was then cooled, the pressure was released and the catalyst was removed. 120 parts of 50% sulphuric acid were added to the filtrate. The mixture was heated at 100° C. for 3 hours. When the pH of the mixture was made 10 with caustic soda, an oil layer separated. When the oil layer was distilled under a reduced pressure, 76 parts of a liquid having a boiling point of 145 to 148° C. under a reduced pressure of 4 mm. Hg were obtained.

The element analysis values of this product were 71.8% C, 13.0% H and 15.2% N. Further, its infrared ray absorption spectra showed characteristic absorption of a trans-double bond at $10.40\mu$ and a cis-double bond at $14.18\mu$.

EXAMPLE 14

4.5 liters of distilled water were added to 500 g. of sodium aluminate and impurities were then removed by filtering the mixture. The thus prepared aqueous solution of sodium aluminate was neutralized by gradually adding a solution of 10% dilute sulphuric acid with stirring. The deposited white precipitate was taken by filtration, was washed three times with cold water and four times with hot water, was then dried at 80° C. and was further dried by elevating the temperature to 350° C. for 2 hours. A mixture of 70 g. of the thus obtained active alumina powder and 240 g. of di (ω-aminopentyl) carbinol was gradually warmed under a nitrogen gas current while being stirred. The water distilled out meanwhile was evaporated and removed. The temperature was then further elevated to 360° C. and the liquid distilled out was taken. When it was distilled under a reduced pressure, 204 g. of a liquid having a boiling point of 142 to 145° C. under a reduced pressure of 7 mm. Hg were obtained. This was a colourless transparent liquid at the normal temperature and was well soluble in methanol, ethanol, isopropyl alcohol, acetone and water.

For its element analysis of $C_{11}H_{24}N_2$, the calculated values were 71.74% C, 13.04% H and 15.22% N and the measured values were 71.68% C, 13.12% H and 15.18% N. It was found from the infrared ray absorption spectra to be trans-1,11-diaminoundecene (5).

EXAMPLE 15

When a vapour of 100 g. of di (ω-aminopentyl) carbinol was passed at a rate of 25 ml./sec. through a reaction tube 25 mm. in inside diameter, charged with 50 g. of granular active alumina of 8 meshes and heated to 300° C., 90 g. of a distillate were obtained. When this distillate was distilled, 68 g. of a colourless liquid having a boiling point of 146–149° C. under a reduced pressure of 9 mm. Hg were taken. When the residue was then again circulated through the catalyst layer and the operation was made in the same manner, 18 g. of a colourless liquid having a boiling point of 145 to 150° C. under a reduced pressure of 9 mm. Hg were obtained. The infrared ray absorption spectra of these products were the same as those of the product in Example 14.

EXAMPLE 16

400 g. of a solution of 45% sulphuric acid were gradually added while being cooled to 100 g. of di (ω-aminopentyl) carbinol. The mixture was then heated and refluxed for 8 hours on an oil bath. It was then cooled. When its pH was made 10 with an aqueous solution of 50% caustic soda, an oil layer separated. When the oil layer was taken and was distilled under a reduced pressure, 81 g. of a colourless transparent liquid having a boiling point of 136 to 140° C. under a reduced pressure of 6 mm. Hg. were obtained. For the elemental analysis of $C_{11}H_{24}N_2$, the calculated values were 71.74% C, 13.04% H and 15.22% N and the measured values were 71.63% C, 12.97% H and 15.15% N. It was found from the infrared ray absorption spectra to be a mixture of trans-1,11-diaminoundecene-(5) and cis-1,11-diaminoundecene-(5).

EXAMPLE 17

400 g. of 18% hydrochloric acid were gradually added while being cooled to 100 g. of di (ω-aminobutyl) carbinol. The mixture was then heated at 90° C. for 8 hours on a hot water bath. It was cooled and was passed through a tower charged with Amberite IR–4B resin (which is an ion-exchange resin produced by Rohm and Haas) to have the hydrochloric acid removed. To the thus obtained aqueous solution were added 107 g. of terephthalic acid. The mixture was heated and stirred at 80° C. An aqueous solution was obtained by filtering the mixture while hot. When the solution was cooled, crystals were deposited. The crystals were taken by filtration. When the recrystallization was further repeated twice with distilled water, 105 g. of white nylon salt were obtained. For its element analysis of $C_{17}H_{26}N_2O_4$, the calculated values were 63.35% C, 8.07% H and 8.70% N and the measured values were 63.20% C, 8.10% H and 8.66% N. It was found from the infrared ray absorption spectra to be a mixture of cis- and trans-1,9-diaminononene-(4) terephthalates.

EXAMPLE 18

500 ml. of 36% hydrochloric acid were gradually added while being stirred under ice cooling to 101 g. of di (ω-aminopentyl) carbinol. The mixture was then heated and refluxed for 12 hours. It was then cooled at 0° C. for 5 hours. When 400 ml. of acetone were then added to it, white crystals were deposited. 500 ml. of a solution of 30% caustic soda were added to 170 g. of the crystals obtained by filtering them. The mixture was heated for 10 hours. It was cooled. When 300 ml. of a solution of 50% caustic soda were further added to the mixture, an oil layer separated.

When the oil layer was distilled under a reduced pressure, a mixture of cis- and trans-isomers of 1,11-diaminoundecene-(5) having a boiling point of 138 to 145° C. under a reduced pressure of 7 mm. Hg was obtained.

EXAMPLE 19

400 ml. of 18% hydrochloric acid were gradually added while being stirred under ice cooling to 101 g. of di (ω-aminopentyl) carbinol. The mixture was then heated and refluxed for 8 hours. 400 ml. of a solution of 36% hydrochloric acid were then added to the mixture. The mixture was further heated and refluxed for 5 hours. It was then cooled to 0° C. 600 ml. of acetone were added to it. When the mixture was stirred, white crystals were deposited. To 122 g. of crystals obtained by filtering them were added 500 ml. of an aqueous solution of 30% caustic soda. The mixture was heated and refluxed for 10 hours. It was cooled. 50 g. of granular caustic soda were added to the mixture. When the mixture was then stirred, an oil layer separated. When the oil layer was distilled under a reduced pressure, 82 g. of 1,11-diaminoundecene having a boiling point of 138 to 147° C. under a reduced pressure of 7 mm. Hg were obtained. When this product was oxidized in an acetic acid solution, N-acetylates of ω-aminobutyric acid and ω-aminovaleric acid were detected. It was found to be a mixture of 1,11-diaminoundecene-(5) and 1,11-diaminoundecene-(4).

EXAMPLE 20

50 g. of a newly prepared thorium oxide powder were added to 174 g. of di (ω-aminobutyl) carbinol. The mixture was gradually warmed to 300° C. while being stirred in a nitrogen gas current and the distillate was taken. When the distillate was distilled under a reduced pressure, 142 g. of a colourless transparent liquid having a boiling point of 121 to 123° C. under a reduced pressure of 6 mm. Hg were obtained. This product was well soluble in methanol, ethanol, acetone and water.

For its element analysis of $C_9H_{20}N_{20}$, the calculated values were 69.23% C, 12.8% H and 17.95% N and the measured values were 69.35% C, 12.77% H and 17.82% N. It was found from the infrared ray absorption spectra to be trans-1,9-diaminononene-(4).

EXAMPLE 21

150 ml. of isopropyl alcohol were added to 52 g. of a mixture of 1,11-diaminoundecene-(5) and 1,11-diaminoundecene-(4) obtained in the same manner as in Example 19. 3 g. of Raney cobalt obtained by development at 80° C. in an aqueous solution of 20% caustic soda were added to the mixture. When the mixture was stirred at 80° C. for 1 hour while blowing in hydrogen gas, 0.27 mol of hydrogen was absorbed.

The mixture was cooled and was then filtered to remove the catalyst. The filtrate was distilled to remove the isopropyl alcohol. When the residue was distilled under a reduced pressure, 50 g. of 1,11-undecamethylene diamine having a boiling point of 141 to 142° C. under a reduced pressure of 7 mm. Hg were obtained.

EXAMPLE 22

When 200 g. of trans-1,9-diaminononene-(4) obtained in the same manner as in Example 20 were stirred at 90° C. under a hydrogen pressure of 3 atmospheres in the presence of a Raney nickel catalyst obtained by developing 5 g. of a Raney nickel alloy (of 50% by weight nickel and 50% by weight aluminum) at 70° C. in a solution of 20% caustic soda, a theoretical amount of hydrogen was absorbed in about 1 hour. When the reaction liquid was filtered while hot to remove the catalyst and was distilled under the normal pressure, 198 g. of white crystals having a boiling point of 258 to 259° C. were obtained. This product showed a melting point of 37° C. Its infrared ray absorption spectra coincided with those of 1,9-nonamethylene diamine.

EXAMPLE 23

100 parts of di ($\omega$-aminopentyl) ketone carbonate and 25 parts of an aqueous solution of 80% hydrazine hydrate were warmed and dissolved in 250 parts of methanol. The methanol was then distilled and recovered. 50 parts of caustic soda were then added to the solution. The solution was heated at 80° C. for 30 minutes and was then heated at an internal temperature of 180° C. for 2 hours by gradually elevating the temperature. When it was cooled, the whole solidified. 100 parts of filtered water and 500 parts of benzene were then added and the product was extracted into the benzene layer. When the benzene layer was taken, had benzene removed by distillation and was then distilled under a reduced pressure, 68 parts of a distillate having a boiling point of 135° C. under a reduced pressure of 5 mm. Hg were obtained. When this product was cooled, it solidified. Its infrared ray absorption spectrum was exactly the same as of the product in Example 23.

EXAMPLE 24

100 parts of di ($\omega$-aminopentyl) ketone carbonate and 29.5 parts of an aqueous solution of 60% hydrazine hydrate were warmed and dissolved in 300 parts of ethanol. The solution was then continuously dropped into 100 parts of caustic potash melted at 200° C. The ethanol, water and excess hydrazine distilled out meanwhile were continuously distilled out of the system. After the completion of the dropping, the mixture was heated at 170° C. for 1 hour, the external temperature was further elevated and the product distilled out was taken. The yield was 61 parts. When the product was cooled, it solidified. Even when it was melted as mixed with the product in Example 23, it showed no melting point drop.

EXAMPLE 25

A solution of di ($\omega$-aminopentyl) ketone carbonate was obtained by dissolving 80 parts of an amine having the Schiff's bond mentioned in the specification by adding 15 parts of filtered water and 100 parts of methanol and then throwing in Dry Ice. A mixture of said solution of di ($\omega$-aminopentyl) ketone carbonate and 29 parts of an aqueous solution of 80% hydrazine hydrate was gradually dropped while keeping the internal temperature at 160° C. into the reaction vessel residue containing caustic potash and used in Example 25. After the completion of the dropping, the mixture was heated at 180° C. for 2 hours and was then cooled. The product was extracted with dichlorethane. When the dichlorethane layer was taken, had the dichlorethane distilled and removal and was distilled under a reduced pressure, 68 parts of 1,11-diaminoundecane having a boiling point of 138° C. under a reduced pressure of 5.5 mm. Hg were obtained.

EXAMPLE 26

100 parts of di ($\omega$-aminopentyl) ketone carbonate were dissolved in 150 parts of distilled water. An autoclave was then charged with the solution together with a Raney copper catalyst made by developing 10 parts of Devarda's alloy. The mixture was stirred at 110° C. for 2 hours under a hydrogen pressure of 100 atmospheres. The temperature was then gradually elevated. The mixture was reduced at 210° C. for 4 hours. It was cooled. The contents were then taken out. The catalyst was removed by filtration. The water removed. When the residue was distilled under a reduced pressure, 68 parts of a distillate of 1,11-diaminoundecane having a boiling point of 135° C. under a reduced pressure of 5 mm. Hg were obtained.

EXAMPLE 27

100 parts of di ($\omega$-aminopentyl) ketone carbonate were heated and dissolved in 300 parts of dioxane. An autoclave was charged with the solution. 10 parts of a copper chromium oxide catalyst were then added to the solution. The mixture was stirred at 200° C. for 6 hours while gradually elevating the temperature under a hydrogen pressure of 120 atmospheres. It was cooled. The pressure was released. The catalyst was then removed by filtration. The dioxane was then removed by distillation. When the residue was distilled under a reduced pressure, 65 parts of 1,11-diaminoundecane having a boiling point of 161° C. under a reduced pressure of 20 mm. Hg were obtained.

What we claim is:

1. A process for producing $\omega,\omega'$-diaminoalkanes of the general formula $$NH_2-(CH_2)_{2n+1}-NH_2$$

wherein $n$ is an integer from 3 to 6, which process comprises converting a compound selected from the group consisting of compounds represented by the formulas

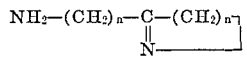

and

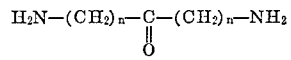

and mixtures thereof to said $\omega,\omega'$-diaminoalkanes by reducing the said compound by heating it with an alkanol having 1 to 6 carbon atoms and an alkali metal hydroxide to obtain diaminocarbinols of the general formula

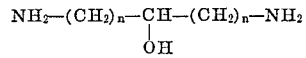

then dehydrating said diaminocarbinols in the presence of a dehydrating catalyst to obtain diaminoalkanes of the formula $$NH_2-(CH_2)_{m1}-CH=CH-(CH_2)_{m2}-NH_2$$

wherein $m_1+m_2$ is an integer 5, 7, 9 or 11 and then catalytically hydrogenating said diaminoalkenes.

2. A process as claimed in claim 1 in which said compound is prepared by heating a nitrogenous compound in the presence of a base, the nitrogenous compound being selected from the group consisting of lactams of 4 to 7 carbon atoms, $\omega$-amino acids of 4 to 7 carbon atoms and polyamides whose component unit is an $\omega$-amino acid of 4 to 7 carbon atoms.

3. A process as claimed in claim 2 in which the nitrogenous compound is $\epsilon$-caprolactam.

4. A process as claimed in claim 2 in which the nitrogenous compound is polycapramide.

5. A process as claimed in claim 2 in which the base is selected from the group consisting of alkali metals, alkaline earth metals, oxides, hydroxides, carbonates, alcoholates and phenolates of alkali metals and alkaline earth metals, amines and quarternary ammonium hydroxides.

6. A process as claimed in claim 1 in which said compound is acetylated prior to the reduction step and the acetyl derivatives derived from said compound are reduced to the acetyl derivative of the diaminocarbinol.

7. A process as claimed in claim 1 in which the alkanol is an alcohol selected from the group consisting of methanol, ethanol, iso-propanol, n-propanol, butanol, glycerol and ethylene glycol and the reducing step is carried out at a temperature of 100 to 300° C. for from 0.5 to 6 hours.

8. A process as claimed in claim 1 in which the diaminocarbinols are dehydrated by passing the heated vapors thereof through a dehydration catalyst supported on an inert catalyst carrier.

9. A process as claimed in claim 1 in which the dehydrating catalyst is a metal oxide.

10. A process as claimed in claim 1 in which the carbinol is dehydrated by heating it in the liquid phase in the presence of an aqueous inorganic acid selected from the group consisting of sulphuric acid, hydrohalide acid and phosphoric acid and converting the salt of the diaminoalkene so obtained to the diaminoalkene.

11. A process for producing ω,ω'-diaminoalkanes of the general formula $$NH_2-(CH_2)_{2n+1}-NH_2$$

wherein $n$ is an integer from 3 to 6, which process comprises converting a compound selected from the group consisting of compounds represented by the formulas

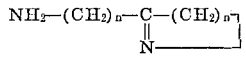

and

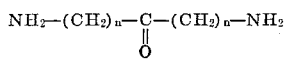

and mixtures thereof to the corresponding diaminoketone carbonates and directly reducing said carbonates to ω,ω'-diaminoalkanes.

12. A process as claimed in claim 11 in which said carbonates are reduced by the Wolff-Kishner reducing method.

13. A process as claimed in claim 11 in which said carbonates are reduced catalytically.

14. A process as claimed in claim 13 in which said carbonates are reduced catalytically at a temperature between 160 and 280° C.

15. A process as claimed in claim 14 in which the catalyst is selected from the group consisting of copper aluminum oxide, copper chromium oxide and nickel.

16. A process as claimed in claim 11 in which the carbonate is obtained from said compound by adding carbon dioxide to said compound in the presence of water.

References Cited

UNITED STATES PATENTS 2,937,185   5/1960   Biel _____ 260—583

FOREIGN PATENTS 624,117   5/1949   Great Britain.
922,275   3/1963   Great Britain.

OTHER REFERENCES

Hargreaves et al., J. Chem. Soc. (London), vol. of 1947, pp. 750–752.

Landa et al., C. A., vol. 50, pp. 10665–10666 (1956).

Todd, "Organic Reactions," vol. 4, pp. 378, 379, 384, 385 and 386 (1948).

Remy, "Treatise On Inorganic Chemistry," vol. I, p. 447 (1956).

FLOYD D. HIGEL, *Primary Examiner.*